United States Patent [19]

Morrison, Jr. et al.

[11] Patent Number: 5,294,664

[45] Date of Patent: * Mar. 15, 1994

[54] AQUEOUS DISPERSIONS OF FLUORESCENT PIGMENTS

[75] Inventors: Robert G. Morrison, Jr., Cleveland; Steven G. Streitel, Brecksville, both of Ohio; Jeffrey R. Cramm, Winfield, Ill.

[73] Assignee: Day-Glo Color Corp., Cleveland, Ohio

[ * ] Notice: The portion of the term of this patent subsequent to Jun. 1, 2010 has been disclaimed.

[21] Appl. No.: 953,651

[22] Filed: Sep. 29, 1992

Related U.S. Application Data

[63] Continuation-in-part of Ser. No. 850,227, Mar. 12, 1992, which is a continuation of Ser. No. 645,364, Jan. 24, 1991, abandoned.

[51] Int. Cl.$^5$ .................. C08L 33/10; C08L 31/02; C08L 81/00; C09K 11/06
[52] U.S. Cl. .................. 524/560; 524/564; 524/565; 524/599; 524/609; 252/301.35
[58] Field of Search ............ 524/560, 564, 565, 599, 524/609; 252/301.35

[56] References Cited

U.S. PATENT DOCUMENTS

| | | | |
|---|---|---|---|
| 3,666,810 | 5/1972 | Hoke | 260/561 N |
| 4,016,133 | 4/1977 | Hyosu et al. | 526/273 |
| 4,302,350 | 11/1981 | Callicott | 252/174.23 |
| 4,623,689 | 11/1986 | Shintani et al. | 524/457 |

Primary Examiner—Joseph L. Schofer
Assistant Examiner—Wu C. Cheng
Attorney, Agent, or Firm—Calfee, Halter & Griswold

[57] ABSTRACT

An aqueous dispersion of a fluorescent pigment comprising: a water insoluble polymer; fluorescent dye; emulsifiers; and water. The polymer comprises: a water insoluble vinyl monomer free of polar groups; vinyl nitrile; a vinyl monomer containing sulfonate groups; and a polar vinyl monomer from the group consisting of: polar acrylate esters; vinyl acetate; polar methacrylate esters and a substituted acrylamide containing hydroxyl or carboxylic ester groups. The invention also relates to a fluorescent pigment and method for preparing the dispersion and pigment.

9 Claims, No Drawings

AQUEOUS DISPERSIONS OF FLUORESCENT PIGMENTS

CROSS REFERENCE TO RELATED APPLICATIONS

The present application is a continuation-in-part of U.S. Ser. No. 07/850,227 filed in Mar. 12, 1992, which issued Jun. 1, 1993 as U.S. Pat. No. 5,215,679, and which was a continuation of U.S. Ser. No. 07/645,364 filed Jan. 24, 1991, now abandoned.

BACKGROUND OF THE INVENTION

Daylight fluorescent pigments absorb radiation in both the ultraviolet and visible ranges of the spectrum and emit visible light by fluorescence. The emitted light adds to the normal reflected color to give brilliant colors which appear to glow in normal daylight. The effect can be very striking. A fluorescent orange color can be up to three times brighter than a conventional orange color in daylight. This fluorescent coloration is desirable in a variety of products including plastics and inks. However, if the pigment is to be used in an ink, particularly in a thin film, the pigment must be of small particle size. Small particle sizes, particularly those sizes of under 10 microns provide a strong brightly colored ink.

Finely divided colored resins or colored pigments heretofore have been prepared by coloring a resin prepared by a condensation polymerization in advance with a dyestuff and then pulverizing the colored resin to obtain finely divided particles. U.S. Pat. Nos. 2,928,873 and 3,116,256 disclose a process for obtaining colored resin particles where a condensate of an aminotriazine compound and an aromatic monosulfonamide compound with formaldehyde is employed as the substrate resin. The resin is then combined with a dye and then ground; however this results in particles having a size greater than one micron. Indeed, presently available grinding methods generally cannot provide particles having an average particle size lower than 3 to 5 microns. Moreover, grinding to such a particle size is quite expensive.

While water continuous emulsion polymerization of vinyl type monomers is a well known polymerization technique which produces particles in the submicron range, such vinyl monomers do not incorporate fluorescent dyes.

It would be desirable to have fluorescent pigments having an average particle size of 10 or less microns which do not require mechanical grinding to achieve their particle size. Such pigments would find use in graphic arts applications such as textile printing inks, gravure or flexographic printing inks, marker inks, and for fluorescent paints. It is also desirable to have a water based pigment system which contains a pigment possessing excellent water resistance and which does not contain volatile organic solvents.

SUMMARY OF THE INVENTION

The present invention provides a fluorescent pigment suitable in one embodiment for use as an ink in thin film printing, having an average particle size of from about 0.01 to about 1, preferably 0.1 to 1 microns. In another embodiment the particle size may be up to about 10 microns and suitable for use as either a pigment suspension or a dry fluorescent pigment. The invention comprises a fluorescent pigment which comprises a polymer and a fluorescent dye, and in one embodiment is further characterized by being a dispersion, preferably an aqueous dispersion. The fluorescent pigment has the following composition: from about 90% to about 99.99%, preferably 98 to 99.5%, by weight, of a water insoluble polymer, and a fluorescent dye in an amount sufficient to impart fluorescent color to the fluorescent pigment, preferably from about 0.01% to about 10%, more preferably about 0.5% to about 2%, by weight, of the fluorescent dye. The aqueous dispersion comprises from about 0.5% to about 99.8%, fluorescent pigment, and from about 0.2% to about 10%, preferably about 0.3% to about 6% by weight of emulsifier. Water is present in the dispersion in an amount to provide a total solids content of about 0.5% up to about 100%. By designing a polymer to be a good solvent for fluorescent dyes, highly fluorescent pigment particles can be prepared by either emulsion or suspension polymerization techniques, neither of which require mechanical grinding to achieve their small particle size.

The polymer comprises: from about 40% to about 80%, preferably about 52% to about 65% total weight, of a water insoluble vinyl monomer free of polar groups; from about 15% to about 35%, preferably about 25% to about 35% total polymer weight, of a vinyl nitrile monomer; from about 1.5% to about 4.5% total weight of a vinyl monomer containing sulfonate groups; and from about 5% to about 20%, preferably about 5% to about 15% total weight of a polar vinyl monomer. The polar vinyl monomer is selected from the group consisting of: polar acrylate esters or methacrylate esters; vinyl acetate; and, a substituted acrylamide containing hydroxyl groups or carboxylic ester groups. The invention also relates to a method of making the aqueous dispersion and the pigment via emulsion polymerization techniques or suspension polymerization techniques.

DETAILED DESCRIPTION OF THE INVENTION

There are several advantages of the invention over current technology. For example, no grinding process is involved in making the pigments, yet the average particle size of the pigment may be made by emulsion polymerization can be as low as about 0.01 microns. Also, the pigment can be supplied in an easy to handle, water wetted form; that is, the pigment particles are dispersed in water to provide an aqueous dispersion. Further, because of the small particle sizes, no milling is required to formulate inks. In addition, the pigment and thus the dispersion display a brighter improved fluorescent color.

The improved brightness is attributable to the small particle size and the increased amount of dye solvents, such as a vinyl nitrile or a polar vinyl monomer, present in the polymer. Vinyl nitriles and other polar vinyl monomers serve as dye solvents during the polymerization process and in the resulting polymer. The use of increased vinyl nitrile or polar vinyl monomer results in dye being better solubilized in the polymer which results in stronger, brighter colors. The better color attributes may also be the result of the dye molecules being surrounded by functional groups in the polymer which enhance the dye's fluorescence. However, it had been found that in emulsion polymerization, as the amount of vinyl nitriles or polar vinyl monomer is increased, the emulsion created during the polymerization fails and the monomers and/or the polymers flocculate.

It has been discovered that by adding a sulfonated monomer, the stability of the emulsion and resulting pigment was increased, thereby preventing flocculation. As a result, more vinyl nitrile monomer or polar vinyl monomer may be added in practice so that the fluorescent dyes have a better developed color.

Because of the kinetics associated with styrene/acrylonitrile emulsion polymerization, as much as 2.0% of acrylonitrile and 1.5% of styrene are present in the emulsion after the initial polymerization is complete. The amount of acrylonitrile present in the pigment dispersion is subject to EPA regulation in the United States. It is therefore desirable to have a low residual acrylonitrile monomer and styrene monomer content. The present invention uses a post treatment monomer reduction system which substantially reduces the amount of residual acrylonitrile and styrene without adversely affecting the color of the final pigment. The resulting dispersion has a very low, that is, below 10 parts per million, residual acrylonitrile monomer content. Similarly, the styrene content is reduced to below 10 parts per million.

The invention provides a fluorescent pigment and in one embodiment, an aqueous dispersion thereof. The pigment comprises a polymer and a fluorescent dye. The dye is closely associated with certain regions of the polymer. The fluorescent pigment has the following composition: from about 90% to about 99.99%, preferably 98 to 99.5%, by weight, of a water insoluble polymer, and a fluorescent dye in an amount sufficient to impart fluorescent color to the fluorescent pigment, preferably from about 0.01% to about 10%, more preferably about 0.5% to about 2%, by weight, of the fluorescent dye. The aqueous dispersion comprises from about 0.5% to about 99.8%, fluorescent pigment, and from about 0.2% to about 10%, preferably about 0.3% to about 6% by weight of emulsifier. Water is present in the dispersion in an amount to provide a total solids content of about 0.5% up to about 100%. The amount of water may be adjusted as desired.

The polymer comprises: from about 40% to about 80%, preferably about 52% to about 65% by total polymer weight of a water insoluble vinyl monomer free of polar groups; from about 15% to about 35%, preferably about 25% to about 35% total polymer weight of vinyl nitrile monomer; from about 1.5% to about 4.5% total polymer weight of a vinyl monomer containing sulfonate groups; and from about 5% to about 20%, preferably about 5% to about 15% by total polymer weight of a polar vinyl monomer. The polar vinyl monomer is selected from the group consisting of: polar acrylate esters or methacrylate esters; vinyl acetate; and, a substituted acrylamide containing hydroxyl groups or carboxylic ester groups.

THE POLYMER

The polymer is formed from at least one monomer selected from each of the following groups of monomers: water insoluble nonpolar vinyl monomers; vinyl nitrile monomers; vinyl monomers containing sulfonate groups; and polar vinyl monomers. As used herein, vinyl means molecules having any carbon-carbon double bond and is not limited to molecules having a carbon-carbon double bond at the end of the molecule.

Water Insoluble Non Polar Vinyl Monomers

While a large number of suitable monomers fall within this category, a preferred group are the styrene monomers such as, for example, methylstyrene, ethylstyrene, isopropylstyrene and butylstyrene. Styrene is more preferred. Styrene may be obtained from Aldrich Chemical Company. In addition to these monoaromatic compounds, poly aromatic compounds such as vinyl naphthalene can be used. These water insoluble vinyl monomers provide the polymer with a high glass transition temperature, enhanced organic solvent resistance, and solidity at room temperature. The water insoluble non-polar vinyl monomers are present from about 40% to about 80%, preferably about 52% to about 65% of the polymer weight.

Vinyl Nitrile Monomers

The second type of monomer to be included in the polymer is a vinyl nitrile monomer. While acrylonitrile is preferred, other equivalent vinyl nitriles may be employed that are homologs or analogs of acrylonitrile, such as, for example, 3-pentenenitrile, and methacrylonitrile. A suitable acrylonitrile may be obtained from Aldrich Chemical Company. The vinyl nitrile is present from about 15% to about 35%, preferably about 25% to about 35% polymer weight. The vinyl nitrile monomers serve as dye solvents. As a result, the presence of the vinyl nitrile monomer improves the solubility of the fluorescent dyes in the monomer phase and the resulting polymer. In addition, the vinyl nitrile monomers provide a more favorable electronic environment for dye fluorescence. The greater the amount of vinyl nitriles present in the polymer, the better the color development of the fluorescent dye and the brighter the resulting pigment.

Vinyl Monomers Containing Sulfonate Groups

The preferred monomers in this group are the vinyl sulfonates described in Hoke U.S. Pat. No. 3,666,810, the disclosure of which is incorporated herein by reference.

The most preferred vinyl monomer containing sulfonate is sodium 2-acrylamido-2-methylpropane-sulfonate, referred to herein as "NaAMPS" or "Sodium AMPS" available under the trade name "Lubrizol 2405" from Lubrizol Corporation.

Other vinyl sulfonates that also can be used are ethylenically unsaturated sulfonic acids such as vinylsulfonic acid, allylsulfonic acid, styrene-sulfonic acid, vinylbenzylsulfonic acid, acryloyloxyethylsulfonic acid, methacryloyloxyethylsulfonic acid and a vinyl ester of an alkylsulfosuccinic acid, and salts thereof such as lithium, sodium, potassium and ammonium salts. The vinyl monomer containing sulfonate groups are present from about 1.5% to about 4.5% polymer weight.

The sulfonate containing monomers impart a high degree of stability to the emulsion during polymerization by stabilizing the polymers, thereby permitting the addition of an increased amount of vinyl nitriles to the polymer.

The Polar Vinyl Monomers

The polar vinyl monomers include, for example, the polar acrylate esters or methacrylate esters, vinyl acetate and substituted acrylamide containing hydroxyl groups or carboxylic ester groups. As used herein, "polar" means more polar than styrene and less polar than sodium AMPS.

The polar methacrylate esters are the preferred group. In this group hydroxypropyl methacrylate, ("HPMA") is the most preferred. A suitable HPMA may be obtained under the trade name "Rocryl 410" from Rohm and Haas. Illustrative of the other polar vinyl monomers are N-(2,2,2-trichloro-1-hydroxyethyl) acrylamide, methyl acrylamidoglycolate methyl ether, or vinyl acetate. The polar vinyl monomer is present from about 5% to about 20%, preferably about 5% to about 15% polymer weight. The polar vinyl monomers, like the vinyl nitrile monomers, act as dye solvents, thereby improving color, particularly with yellow, red and orange pigments.

EMULSIFIERS

Two general types of emulsifiers may be used in the present invention. Surfactants, which are comprised of anionic surfactants and nonionic surfactants, and dispersants.

Surfactants which must be used in emulsion polymerization, are surface active agents which, when used above their critical micelle concentration form micelles. In emulsion polymerization, these micelles act as the site for polymerization. The number of micelles in an emulsion polymerization reaction is dependent on the concentration of surfactant and determines the final polymer particle size. Once the polymerization is complete the surfactants help to stabilize the polymer particles which are suspended in water. Generally, the median polymer particle sizes obtained through this mechanism are less than 1 micron.

Dispersants which must be used in suspension polymerization, are also surface active agents, but they do not form micelles. In suspension polymerization, monomer droplets act as the site for polymerization. The rate of mixing determines the number of monomer droplets and thereby the final polymer particle size. The dispersants help to keep the monomer droplets which are formed through agitation from coalescing, but unlike surfactants, they are not sufficient to sustain monomer droplets without agitation. Generally, the median polymer particle sizes obtained through this mechanism are greater than i micron. Because of their size, suspension polymer particles may be either filtered and dried or remain suspended in water.

Frequently, surfactants and dispersants are used together and thus the mechanism of polymerization is a hybrid of the two models discussed above.

SURFACTANTS

The surfactants may be anionic or nonionic or a mixture thereof. The surfactants emulsify the monomers prior to and during the polymerization process. Thereafter, the surfactants may also disperse the polymer particles in the dispersion. Surfactants which are necessary to make an emulsion polymer are used in an effective amount up to 10% of the emulsion.

Anionic Surfactants

Anionic surfactants may be used alone Or in addition to nonionic surfactants. Anionic surfactants serve not only to emulsify the monomers during polymerization, but also act as dye solvents for the fluorescent dyes. Certain anionic surfactants such as Siponate DS-4, Sipex EST-30 or Alipal EP-120 increase the solubility of the cationic Rhodamine dyes in the monomer phase and thereby substantially improve the color shade, strength and brightness of the final pigment.

In a preferred embodiment of the invention, the anionic surfactant is a sulfate. The presence of surfactants in the prepolymerization mixture results in the emulsification of the monomers in the surrounding water. Upon the addition of the initiator system, the monomers polymerize to produce small pigment particles that are dispersed in the water. This water dispersion may be used in this form as an ink or dehydrated and resuspended in water or oil.

Illustrative of typical anionic surfactants that may be used in the practice of the invention are broadly described as the water-soluble salts, particularly the alkali metal or ammonium salts, of organic sulfuric or phosphoric acid reaction products having in their molecular structure an alkyl or alkylaryl radical containing from about 8 to 22 carbon atoms and a radical selected from the group consisting of sulfonic, sulfuric, or phosphoric acid ester radicals. (Included in the term alkyl is the alkyl portion of higher acyl radicals).

Examples of the anionic surfactants which can be employed in the practice of the present invention are the sodium, potassium, or ammonium alkyl sulfates, especially those obtained by sulfating the higher alcohols (alcohol having $C_8$–$C_{18}$ carbon atoms) produced by reducing the glycerides of tallow or coconut oil such as for example, sodium lauryl sulfate, available under the trade name "Sipon UB" from Rhone-Poulenc or sodium lauryl phosphate. Other examples include sodium, potassium, or ammonium alkyl aromatic sulfonates, in which the alkyl group contains from about 9 to about 15 carbon atoms, the alkyl radical is a straight or branched aliphatic chain, the aromatic group is benzene or polycyclic group such as naphthalene; such examples include: sodium dodecyl benzene sulfonate, available under the trade name "Siponate DS-4" from Rhone-Poulenc, or sodium alkyl naphthalene sulfonate, available under the trade name "Nekal BA-77" from Rhone-Poulenc. Other examples include paraffin sulfonate surfactants having the general formula $RSO_3M$, wherein R is a primary or secondary alkyl group containing from about 8 to 22 carbon atoms (preferably 10 to 19 carbon atoms) and M is an alkali metal, e.g., sodium or potassium, for example, sodium olefin sulfonate, available under the trade name "Siponate 301-10" from Rhone-Poulenc). Further examples include: sodium alkyl glycerol ether sulfonates, especially those ethers of the higher alcohols derived from tallow and coconut oil; and sodium coconut oil fatty acid monoglyceride sulfates, sulfonates or phosphates. Additional examples include sodium, potassium, or ammonium salts of sulfuric acid esters of the reaction product of one mole of a linear or branched higher alcohol (e.g., tallow or coconut oil alcohols), and about 1 to about 40 moles of ethylene oxide, such as the surfactants available under the trade name "Sipex EST-30" from Rhone-Poulenc. Further examples include sodium, potassium, or ammonium salts of alkyl phenol ethylene oxide ether sulfates having about 1 to about 100 units of ethylene oxide per molecule and in which the alkyl radicals contain from about 8 to about 12 carbon atoms, such as, for example: the sodium salt of sulfated alkyl phenol ethoxylate (n=4), available under the trade name "Alipal CO-436"; the ammonium salt of sulfated nonylphenol ethoxylate (10EO), available under the trade name "Alipal EP-110"; the ammonium salt of sulfated nonylphenol ethoxylate (30EO), available under the trade name "Alipal EP-120"; and other "Alipal" surfactants from Rhone-Poulenc and a sodium salt of an alkylaryl polyether sulfonate available under the trade name "Triton x-200" from Rohm & Haas. Additional examples include: the reaction products of fatty acids esterified with isethionic acid and neutralized with sodium hydroxide where, for example, the fatty acids are derived from coconut oil, available under the trade name "Igepon AC-78" surfactants from Rhone-Poulenc; and sodium or potassium salts of fatty acid amides of a methyl taurine in which the fatty acids, for example, are derived from coconut oil and sodium or potassium B-acetoxy- or B-acetamido-alkane-sulfonates where the alkane has from 8 to 22 carbon atoms. Still further examples include: sodium alkyl sulfosuccinates where the alkyl moiety is from 4 to 26 carbon atoms such as dihexyl ester sulfosuccinate, available under the trade name "Aerosol MA 80" from American Cyanamid, or OT surfactants from American Cyanamid or Alconate surfactants from Rhone-Poulenc; disodium ethoxylated alcohol or ethyoxylated alkyl phenol half esters of sulfosuccinic acid, such as the disodium salt of ethoxylated lauryl alcohol ester sulfosuccinate, available under the trade name "Aerosol A-102" or the disodium salt of ethoxylated nonyl phenol ester sulfosuccinate, available under the trade name "Aerosol A-103" from American Cyanamid; and alkylated disulfonated diphenyl oxides such as disodium mono and didodecyl diphenyl oxide disulfonate, available under the trade names "Aerosol DPOS-45" from American Cyanamid or "Dowfax" from Dow Chemical Company. Further suitable surfactants include fluorinated derivatives of above mentioned classes of surfactants such as the Zonyl surfactants from DuPont or the Fluorad surfactants from 3M. Also, mixtures of the above listed surfactants are also suitable.

Further anionic emulsifiers which are suitable are described in "McCutcheon's Functional Materials North American Edition," and "McCutcheon's Emulsifiers and Detergents North American Edition," The Manufacturing Confectioner Publishing Co., 1989.

Nonionic Surfactants

Nonionic surfactants may be used alone or in addition to anionic surfactants. Nonionic surfactants serve not only to emulsify the monomers during polymerization, but also act as dye solvents for the fluorescent dyes. Certain nonionic surfactants such as Igepal CO-430, Igepal CA-887, or Siponic L25 can increase the color purity of a pigment by 30 to 40% as compared to the same pigment prepared using anionic surfactants alone.

Nonionic surfactants may be used without anionic surfactants, although this results in poor incorporation of cationic dyes into the polymer. However, the incorporation of nonionic dyes into the polymer proceeds satisfactorily in the absence of anionic surfactants.

Examples of the nonionic surfactants which can be employed in the practice of the present invention are: the higher alcohols (C8 to C18 carbon atoms) such as 1-dodecanol, available from Aldrich Chemical; and the reaction products of one mole of a higher linear or branched fatty alcohol (e.g. tallow or coconut oil alcohols) with about 1 to about 100 moles of ethylene oxide, such as tridecyloxypoly(ethyleneoxy)ethanol, commercially available under the trade name "Emulphogene" from Rhone-Poulenc, or ethoxylated cetylalcohol, commercially available under the trade name "Siponic E" from Rhone-Poulenc, or ethoxylated (n=23) lauryl alcohol, commercially available under the trade name "Siponic L25" from Rhone-Poulenc. Further suitable nonionic surfactants include: ethoxylated alkyl phenols having from about 1 to about 100 units of ethylene oxide per molecule and in which the alkyl moiety contains from about 8 to about 12 carbon atoms, such as, for example, ethoxylated (n=2) nonyl phenol, available under the trade name "Igepal CO-210," ethoxylated (n=4) nonyl phenol, available under the trade name "Igepal CO-430," ethoxylated (n=9) nonyl phenol, available under the trade name "Igepal CO-660", ethoxylated (n=30) octyl phenol, available under the trade name "Igepal CA-887" which, like the preceding, are from Rhone-Poulenc, or "Siponic F-300" from Rhone-Poulenc, and dinonylphenol ethoxylate (n=49), available under the trade name "Igepal DM-880" from Rhone-Poulenc and other ethoxylated alkyl phenol surfactants available under the trade names "Igepal" or "Siponic F" from Rhone-Poulenc. Further suitable surfactants include: alkyl polyether carboxylates with about 1 to about 100 units of ethylene oxide per molecule, available under the trade name "Akypo" from Rhone-Poulenc; block copolymers of ethylene oxide and propylene oxide such as, for example, those surfactants available under the trade names "Pluronic" or "Tetronic" from BASF; and acetylenic glycols reacted with from 1 to 100 moles of ethylene oxide such as diethoxylated (n=30) 2,4,7,9-tetra-methyldecyn-4,7-diol available under the trade name "Surfynol 485" from Air Products. Further suitable nonionic surfactants include the fluorinated derivatives of above mentioned classes of surfactants which are available under the trade name "Zonyl" from DuPont, or the "Fluorad" surfactants from 3M.

Good results have been obtained using ethoxylated (n=4) nonylphenol available under the trade name Igepal CO-430 from Rhone-Poulenc.

DISPERSANTS

The use of a dispersant is optional when making an emulsion polymer. When used, the dispersant is used from an effective amount up to about 10% by weight of the emulsion. The use of dispersants with anionic surfactants, nonionic surfactants or a mixture thereof, promotes the emulsion of the monomers during polymerization and enhances the dispersion of the polymer particles in water. However, use of a dispersant alone, without an anionic surfactant or a nonionic surfactant, results in a polymer produced by suspension polymerization mechanism, rather than by an emulsion polymerization mechanism.

Suitable dispersants include: 1) water soluble polymers such as: gelatin, starch, methylcellulose, methylcellulose derivatives such as, for example hydroxypropyl methylcellulose, commercially available under the trade name "Methocel" from Dow Chemical Company, polyvinyl alcohol, available under the trade name "Airvol" from Air Products, polyacrylic acid salts, available under the trade name "Tamol 731" from Rohm & Haas, or sodium salts of naphthalene formaldehyde condensates such as, for example, "Tamol SN" from Rohm & Haas or "Daxad 17" from W. R. Grace. Other suitable dispersants include: barely water soluble salts such as, for example, barium sulfate, calcium sulfate, barium carbonate, calcium carbonate, and, calcium phosphate; and, inorganic macromolecules such as, for example, talc, bentonite, and clay. The most preferred dispersant for use with anionic and/or nonionic surfactants is polyvinyl alcohol.

THE FLUORESCENT DYES

The fluorescent dyes employed in the composition include fluorescent organics which are brilliantly fluorescent when in solution or dissolved in a polymer. These daylight fluorescent-types are well known in the art, and belong to the dye families known as benzothioxanthene, xanthene, coumarin, naphthalimide, benzoxanthene, perylene, and acridine. The dyes employed in the practice of the present invention may be either water soluble or insoluble and may be nonionic or, cationically charged.

Typical dyes include Basic Red 1, a cationic Rhodamine F5G dye commercially available as "Basonyl Red 482," from BASF; Basic Violet 10, a cationic Rhodamine B dye commercially available as "Basonyl Red 540," from BASF; Basic Violet 11, Basic Violet 11:1 a cationic Rhodamine F3B dye, commercially available as "Basonyl Red 560," from BASF; Basic Violet 16, a methine dye commercially available as "Basacryl Brilliant Red BG," from BASF; Basic Yellow 40, a nonionic Coumarin dye commercially available as "Maxilon Brilliant Flavine 10GFF," from Ciba-Gigy; Solvent Yellow 43, a nonionic Naphthalimide dye commercially available as "Hudson Yellow," from Day-Glo Color Corporation; Solvent Yellow 44, a nonionic Naphthalimide dye commercially available as "Yukon Yellow," from Day-Glo Color Corporation; Solvent Yellow 131, a nonionic Naphthalimide dye commercially available as "Mohawk Yellow," from Day-Glo Color Corporation; Solvent Yellow 135, a nonionic Coumarin dye commercially available as "Alberta Yellow," from Day-Glo Color Corporation; and, Solvent Yellow 160, a nonionic Coumarin dye commercially available as "Potomac Yellow," from Day-Glo Color Corporation.

The dye is added from an effective amount, that is, an amount that provides the desired fluorescent hue and brightness, up to about 10% by weight of the pigment weight. In an emulsion, the upper limit of the dye may be expressed as about 5% total emulsion weight.

Where dyes such as Rhodamine F3B are used, it is preferred that a chelating agent such as tetra sodium ethylene diamine tetra acetic acid tetrahydrate available under the trade name "Versene 220" from Dow Chemical Co. be used to chelate zinc that is present along with the dye. If ionic zinc remains in the emulsion, it will disrupt anionic surfactants causing the emulsion to fail.

PARTICLE SIZE OF THE POLYMER

Pigments having small median particle size, from about 0.01 to about 10 microns have applications in the paint and graphic arts industries and are desirable because the pigments have good color brightness. Pigments having particles with median size of about 0.01 to about 0.25 micron size are particularly useful in pen inks. Such pigments may be prepared by using emulsion polymerization techniques. Employing an anionic surfactant, depending on the particular anionic surfactant, will typically produce pigments having a median particle size of less than 0.25 microns.

For applications such as flexographic and gravure printing ink, textile printing ink and paper coating, pigment particles having a median size of 0.25 to 1.0 micron are desired. Pigment particles of such size may be obtained using emulsion polymerization or suspension polymerization techniques. To obtain such particle sizes nonionic surfactants may be used in addition to anionic surfactants during polymerization. Alternatively, the median particle size may be increased above 0.25 microns by decreasing the amount of anionic surfactants.

It should be noted that in order for anionic surfactant to have effect on the particle size, there must be free anionic surfactant. It has been found that where a cationic dye is used, the number of moles of the cationic dye will bind a corresponding number of moles of anionic surfactant. Accordingly, it is the amount of free or unbound anionic surfactant that is available to emulsify the monomers and thereby determine the particle size of the polymer. To determine the amount of free anionic surfactant when using a given cationic dye, a series of emulsion polymerizations may be performed in which the surfactant amount is varied and the pigment particle size measured.

For certain coating applications paints and thicker film printing inks including screen printing inks a median particle size in the range from about 1.0 to 10 microns is preferred to maximize color brightness. These pigments are made using a suspension polymerization technique. In suspension polymerization, the median particle size is determined by the rate of mixing of the monomers and water; the faster the rate of mixing, the smaller the particle.

PREPARATION OF THE POLYMER INITIATORS

While a variety of conventional initiators may be used to initiate the free radical polymerization of the monomers, good results have been obtained using a redox initiation system. By redox initiation system, it is meant the initiator system includes a reducing agent and an oxidizing agent. Good results have been obtained using an oxidizing agent such as ammonium persulfate, also referred to as "APS" from EM Science, and a reducing agent such as erythorbic acid, referred to as "EA" from Pfizer, or sodium formaldehyde sulfoxylate, referred to as "SFS" from Aceto Corporation.

In addition to the reducing and oxidizing agent initiators, an iron EDTA complex is preferably added to catalyze the reaction. Iron sulfate heptahydrate from J. T. Baker and tetrasodium EDTA, available under the trade name "Versene 220" from Dow Chemical Co. may be used for this catalyst. The amount and rate at which the initiators are added controls the rate of polymerization; good results have been obtained using from about 0.02% to about 0.3% by weight, preferably about 0.04% to about 0.2% by weight of ammonium persulfate; from about 0.02% to about 0.6% by weight, preferably about 0.04% to about 0.4% by weight of erythorbic acid and from about 0.01% to about 0.2% by weight, preferably about 0.02% to about 0.1% by weight of the total emulsion weight; of iron EDTA complex. Where a redox initiator system is employed the pH of the dispersion polymerization components is from 1 to 5, preferably 3 to 4.

Some initiators, for example ammonium persulfate, t-amylperoxy-neodecanoate, also referred to as "t-APND" from ATOCHEM, or 2,2'-Azobis(2-amidinopropane) dihydrochloride, available under the trade name "V-50" from Wako Pure Chemical Industries, may be used alone as thermal initiators. Good results have been obtained using from about 0.02% to about 0.3% ammonium persulfate, t-amyl-peroxy-neodecanoate or 2,2'-Azobis(2-amidinopropane) dihydrochloride. When employing thermal initiators the pH of the dispersion components prior to polymerization is from about 1 to about 10, preferably about 3 to about 4.

POST POLYMERIZATION MONOMER REDUCTION SYSTEM

After the addition of the initiators and the polymerization of the monomers, residual monomers, particularly acrylonitrile and styrene, may be removed by the addition of post polymerization monomer reduction initiator. Such post polymerization monomer reduction initiator is, preferably, another set of redox initiators comprising a mixture of from about 0.1% to about 2.0% of a reducing agent such as erythorbic acid and from about 0.1% to about 1.0% of an oxidizing agent such as a peroxide, such as, for example, tert-butyl hydroperoxide. However, the reducing agent is an optional post polymerization monomer reduction initiator. Although less preferred, a peroxide without a reducing agent may be used or a second application of the redox initiator system may be used.

To further reduce the least reactive residual monomer, an additional charge of a more reactive monomer may be added prior to beginning the feed of the post polymerization monomer reduction initiators. Such addition of a more reactive monomer serves to plasticize the existing polymer particles thereby making the less reactive residual monomer more soluble in the existing polymer. Also, the more reactive monomer starts new polymer chains which are more reactive than chains begun with the less reactive monomer. For example, to reduce the amount of residual acrylonitrile, a more reactive monomer, preferably styrene, is added prior to beginning the feed of the post polymerization monomer reduction initiators. From about 0.1% to about 1%, preferably about 0.5% styrene may be added for this purpose. This allows both styrene and acrylonitrile to be reduced to below detectable levels, that is, below approximately 10 ppm. However, the addition of the more reactive monomer is optional, though preferable. It has been found that this post polymerization monomer reduction system reduces the residual acrylonitrile from about 1.5% to under 10 ppm, and styrene may be reduced from about 0.5% to under 10 ppm.

As a result of the post polymerization monomer reduction system, the residual monomer is polymerized.

EMULSION POLYMERIZATION

The emulsions were prepared using typical emulsion polymerization techniques utilizing free radical initiators such as the persulfates, peroxides and azo compounds. Three emulsion polymerization procedures that provide satisfactory pigment are described below. Procedure I provides a method for making the pigment dispersion in batch and employing the redox initiator and a post polymerization monomer reduction system, Procedure II provides a method in which a preemulsion technique is combined with the redox initiation technique and the post polymerization monomer reduction system, and procedure III provides a method employing a thermal initiator system. By employing a preemulsion technique, the particle size may be more easily controlled. Preemulsion techniques are described in a publication entitled "Surfactants and Specialties in Emulsion Polymerization Systems", Chapter 3, Rhone Poulenc, CN 7500 Cranberry N.J, and "Emulsion Polymerization of Acrylic Monomers", Chapter 2, Rohm and Haas, Independence Mall West, Philadelphia Pa. In general, procedure I illustrates the preferred emulsion polymerization procedure.

PROCEDURE I

Batch Pink Fluorescent Dispersion by Emulsion Polymerization with Redox Initiation The following materials were added to 1.5 liter resin flask: 487.9 g D.I. (deionized) water; 28.8 g of 50% aqueous NaAMPS; 2.9 g of the chelating agent, Versene 220; 48.7 g of tridecyl ether sulfate, Sipex EST-30 (anionic surfactant); 0.5 g of 93% sulfuric acid; 4.2 g of the polyvinyl alcohol, Airvol 203 (dispersant); 4.08 g of the Rhodamine F3B dye; 9.84 g of the Rhodamine F5G dye; and 0.29 g of the Potomac Yellow dye. The flask was equipped with a heat tape, reaction flask head, reflux condenser and agitator. This mixture was nitrogen purged above the liquid level for 30 minutes while stirring at 400 rpm. Then 288 g of styrene, 129.6 g of acrylonitrile and 48 g of hydroxypropyl methacrylate were added to the flask with mixing to form an emulsion. The temperature of the emulsion was increased to 60° C. using a temperature controller. Thirty minutes after monomer addition, a solution prepared from 16 g D.I. water, 0.5 g of the chelating agent Versene 220, 0.08 g of 93% sulfuric acid and 0.17 g of the iron sulfate heptahydrate was added to the emulsion. After mixing for 10 minutes a solution of ammonium persulfate (2.4 g of APS in 20 g of D.I. Water) and a solution of erythorbic acid (3.7 g of EA in 18.5 g of D.I. water) were added at an initial rate of 8cc/hr. The addition rate of the initiator solutions was decreased during the course of the reaction to maintain a constant temperature of 60° C. After all of the initiators were added, 6 g of styrene were added to the emulsion. Thereafter, the post polymerization monomer reduction was employed by the adding of a solution of tert-butylhydroperoxide (7.2 g 70% aqueous t-BHP in 30 g D.I. Water) and a solution of erythorbic acid (9.8 g EA in 31.2 g D.I. water) which were fed into the emulsion over 2.5 hours. The resulting fluorescent dispersion was excellent in color shade, strength and brightness. Procedure I is the preferred procedure for emulsion polymerization.

PROCEDURE II

Orange Fluorescent Dispersion by Emulsion Polymerization Preparation using Preemulsion Feed Technique with Redox Initiation The following materials were added to a 500 ml. reaction flask: 40.7 g D.I. water, 0.1 g Versene 220, 0.01 g 93% sulfuric acid and 0.04 g iron sulfate-heptahydrate (Mixture 1). The flask was equipped with a reaction flask head, reflux condenser and agitator. Then a second mixture of 80 g D.I. water, 0.6 g Versene 220, 5.17 g of 58% NaAMPS, 5.1 g Sipex EST-30, 5.4 g Igepal CA-887, 0.15 g 93% sulfuric acid, 1.5 g Potomac Yellow Dye, 0.44 g Rhodamine F5G, and 0.22 g Rhodamine F3B were added to a second container. Both mixtures were purged for 30 minutes with nitrogen to remove residual oxygen. Next 60 g of Styrene, 27 g of Acrylonitrile, and 10 g of Hydroxypropylmethacrylate were added to the second mixture and the resulting mixture was agitated to form a stable preemulsion. Mixture I was then heated to 60° C. using a temperature controlled water bath. Ammonium Persulfate (0.6 g of APS in 3.6 g of D.I. water) and Erythorbic acid (0.93 g of EA in 3.8 g D.I. water) initiator solutions were prepared and ⅓ of each solution was added to mixture 1. Mixture 2 and the remaining ⅔ of the initiator solutions were then pumped into the reactor containing Mixture I at such a rate as to maintain the temperature of Mixture I at 60° C. without using additional heating. When the addition was complete, the polymer emulsion was heated for an additional 1 hr. and the post polymerization monomer reduction step was begun. t-Butylhydroperoxide (0.25 g t-BHP in 1.75 g D.I. water) and Erythorbic acid (0.34 g EA in 2.0 g D.I. water) solutions were then added to the emulsion polymer. The temperature was maintained at 60° C. for an additional hour. The resulting orange fluorescent dispersion possessed excellent color strength, shade and brightness.

PROCEDURE III

Batch Yellow Fluorescent Dispersion by Emulsion Polymerization with Thermal Initiation The following materials were added to a 500 ml reaction flask: 143.9 g of D.I. water; 5.17 g of 58% Na AMPS; 0.50 g Versene 220; 0.9 g of Sipex EST-30, 2.0 g of Potomac Yellow Dye, and 0.17 g 93% sulfuric acid. The flask was equipped with a reaction flask head, reflux condenser and agitator. The mixture was purged with nitrogen for 30 minutes to remove dissolved oxygen. Then 60 g of styrene, 27 g of acrylonitrile, and 4.0 g of hydroxypropyl methacrylate were added to the reactor and the resulting emulsion was heated to 60° C. using a temperature controlled water bath. Next 0.3 g of ammonium persulfate was added to the reactor and the mixture was continuously agitated. After 4 hours at 60° C., the temperature was increased to 85° C. for an additional 1 hour. The resulting yellow fluorescent dispersion was excellent in color shade, strength and brightness.

PROCEDURE IV

Suspension Polymerization

Classic suspension polymerization techniques may be used to perform suspension polymerization. Suspension polymerization may be used to provide pigment particles having an average particle size of about 0.5 microns and larger, depending on the rate of sheer. The rate of sheer needed to produce a polymer of a particular size depends upon the equipment being used. In the following example, a rate of sheer of from about 200 to about 600 rpm may be employed. The following procedure was employed to produce a yellow fluorescent pigment.

Yellow Fluorescent Pigment Dispersion by suspension Polymerization with Thermal Initiation The following materials were added to a 1.5 liter resin flask: 685 g of D.I. water; 24.8 g of 58% aqueous NaAMPS; 4.3 g Methocel; 9.12 g Tamol 731; and 9.6 g of Potomac Yellow dye. The flask was equipped with a heat tape, reaction flask head, reflux condenser and agitator. This mixture was nitrogen purged above the liquid level for 30 minutes while stirring at 400 rpm. Then 288 g of styrene, 129.6 g of acrylonitrile and 48 g of hydroxypropyl methacrylate were added to the flask while mixing. The temperature of the suspension was increased to 60° C. using a temperature controller. Next 1.4 g of a thermal initiator, t-amyl-peroxy-neodecanoate was added to the mixture and the temperature was held at 60° C. for 4 hours. The batch was cooled and filtered to recover the yellow fluorescent pigment.

In addition to the above four examples of pigments, Table I provides additional examples of a variety of colors of pigments, utilizing either suspension or emulsion polymerization techniques and also using nonionic surfactants alone or in combination with anionic surfactants.

TABLE 1

| Ex. | Color Proc. | Monomers | | | | Dyes | | | Surfactants | | | Initiators |
| | | Styrene | Acrylo-nitrile | HPMA | NaAMPS | | | | anionic | nonionic | Disp. | |
|---|---|---|---|---|---|---|---|---|---|---|---|---|
| 1 | Orange I | 288 | 129.6 | 48 | 14.4 | POT 7.2 | F5G 2.6 | F3B 1.0 | U 15.8 | M 16.8 | E 4.2 | APS/EA/Fe 2.4/3.7/0.17 t-BHP/ERA 7.2/9.9 |
| 2 | Orange II | 60 | 27 | 10 | 3 | POT 1.5 | F5G 0.44 | F3B 0.22 | U 5.1 | O 5.4 | | APS/EA/Fe 0.6/0/9/0.04 t-BHP/ERA 0.25/0.34 |
| 3 | Yellow III | 60 | 27 | 10 | 3 | | POT 2.0 | | U 0.9 | | | APS 0.6 |
| 4 | Yellow IV | 288 | 129.6 | 48 | 14.4 | | POT 9.6 | | | Q 4.3 | Y 9.1 | t-APND 1.4 |
| 5 | Yellow I | 288 | 129.6 | 48 | 14.4 | | POT 9.6 | | U 4.63 | | E 4.2 | APPS/EA/Fe 2.4/3.7/0.17 t-BHP/ERA 7.2/9.9 |
| 6 | Pink I | 288 | 129.6 | 48 | 14.4 | F5G 9.8 | F3B 4.1 | POT 0.3 | U 48.8 | | E 4.2 | APPS/EA/Fe 2.4/3.7/0.17 t-BHP/ERA 7.2/9.9 |
| 7 | Magenta I | 288 | 129.6 | 48 | 14.4 | F3B 10.3 | | F5G 8.9 | U 63.6 | | E 4.2 | APS/EA/Fe 2.4/3.7/0.17 t-BHP/ERA 7.2/9.9 |
| 8 | Orange III | 60 | 27 | 10 | 3 | POT 1.5 | F5G 0.53 | F3B 0.28 | U 1.1 | | | APS 0.3 |
| 9 | Orange III | 60 | 27 | 10 | 3 | POT 1.5 | F5G 0.53 | F3B 0.8 | U 1.1 | S 2.8 | | APS 0.3 |
| 10 | Orange III | 60 | 27 | 10 | 3 | POT 1.5 | F5G 0.53 | F3B 0.28 | U 1.1 | L 2.8 | | APS 0.3 |
| 11 | Orange III | 60 | 27 | 10 | 3 | POT 1.5 | F5G 0.53 | F3B 0.28 | U 1.1 | N 2.8 | 0.3 | APS |

TABLE 1-continued

| # | Name | | | | | | | | | | | |
|---|------|---|---|---|---|---|---|---|---|---|---|---|
| 12 | Orange III | 60 | 27 | 10 | 3 | POT 1.5 | F5G 0.53 | F3B 0.28 | U 1.1 | M 1.1 | | APS 2.8 0.3 |
| 13 | Orange III | 60 | 27 | 10 | 3 | POT 1.5 | F5G 0.53 | F3B 0.28 | U 1.1 | P 1.1 | | APS 2.8 0.3 |
| 14 | Orange III | 60 | 27 | 10 | 3 | POT 1.5 | F5G 0.53 | F3B 0.28 | U 1.1 | J 2.8 | | APS 0.3 |
| 15 | Orange III | 60 | 27 | 10 | 3 | POT 1.5 | F5G 0.53 | F3B 0.28 | U 1.1 | I 2.8 | | APS 0.3 |
| 16 | Orange III | 60 | 27 | 10 | 3 | POT 1.5 | F5G 0.53 | F3B 0.28 | F 1.1 | M 2.8 | | APS 0.3 |
| 17 | Orange III | 60 | 27 | 10 | 3 | POT 1.5 | F5G 0.53 | F3B 0.28 | Z 1.1 | M 2.8 | 0.3 | APS |
| 18 | Orange III | 60 | 27 | 10 | 3 | POT 1.5 | F5G 0.53 | F3B 0.28 | R H 3.0 1.6 | | | APS 0.3 |
| 19 | Orange III | 60 | 27 | 10 | 3 | POT 1.5 | F5G 0.53 | F3B 0.28 | D G 1.4 0.9 | | | APS 0.3 |
| 20 | Orange III | 60 | 27 | 10 | 3 | POT 1.5 | F5G 0.53 | F3B 0.28 | H 2.6 | M 3.3 | | APS 0.3 |
| 21 | Orange III | 60 | 27 | 10 | 3 | POT 1.5 | F5G 0.53 | F3B 0.28 | D 2.1 | O 4.7 | | APS 0.3 |
| 22 | Orange III | 60 | 27 | 10 | 3 | POT 1.5 | F5G 0.53 | F3B 0.28 | D H 1.6 1.3 | | | APS 0.3 |
| 23 | Orange III | 60 | 27 | 10 | 3 | POT 1.5 | F5G 0.53 | F3B 0.28 | C H 2.6 1.3 | | | APS 0.3 |
| 24 | Orange III | 60 | 27 | 10 | 3 | POT 1.5 | F5G 0.53 | F3B 0.28 | V K 1.5 1.2 | | | APS 0.3 |
| 25 | Orange III | 60 | 27 | 10 | 3 | POT 1.5 | F5G 0.53 | F3B 0.28 | B 5.0 | | | APS 0.3 |
| 26 | Orange III | 60 | 27 | 10 | 3 | POT 1.5 | F5G 0.53 | F3B 0.28 | B 4.2 | O 7.0 | | APS 0.3 |
| 27 | Orange III | 60 | 27 | 10 | 3 | POT 1.5 | F5G 0.53 | F3B 0.28 | D 1.4 | B 1.0 | | APS 0.3 |
| 28 | Orange III | 60 | 27 | 10 | 3 | POT 1.5 | F5G 0.53 | F3B 0.28 | U 1.5 | X 3.3 | | APS 0.3 |
| 29 | Orange III | 60 | 27 | 10 | 3 | POT 1.5 | F5G 0.53 | F3B 0.28 | A 0.9 | O 3.3 | | APS 0.3 |
| 30 | Yellow III | 60 | 27 | 10 | 3 | POT 2.0 | | | | W 5.0 | | APS 0.3 |

All amounts are in grams.

APPENDIX TO TABLE 1

| ID | Trade Name | Supplier | Chemical Name |
|----|-----------|----------|---------------|
| A | Abex JKB (anionic) | Rhone-Poulenc/Alcolac | 30% proprietary surfactant in water |
| B | Aerosol A-103 (anionic) | American Cyanamid | 34% ethoxylated nonyl phenol ester sulfosuccinate in water |
| C | Aerosol DPOS-45 (anionic) | American Cyanamid | 45% disodium mono- & didodecyl diphenyl oxide disulfonate in water |
| D | Aerosol MA-80 (anionic) | American Cyanamid | 80% dihexyl ester sulfosuccinate in water |
| E | Airvol 203 (dis) | Air Products | 100% poly vinyl alcohol |
| F | Alipal CO-436 (anionic) | Rhone-Poulenc/GAF | 58% sodium salt of sulfated alkylphenol ethoxylate (n = 4) in water |
| G | Alipal EP-110 (anionic) | Rhone-Poulenc/GAF | 30% ethoxylated (n = 10) nonyl phenol sulfate in water |
| H | Alipal EP-120 (anionic) | Rhone-Poulenc/GAF | 30% ethoxylated (n = 30) nonyl phenyl sulfate in water |
| I | 1-butanol (dye solvent) | Aldrich Chemical Co. | |
| J | 1-dodecanol (nonionic) | Aldrich Chemical Co. | |
| K | Gafac RE-960 (anionic) | Rhone-Poulenc/GAF | 90% phosphate ester in water |
| L | Igepal CO-210 (nonionic) | Rhone-Poulenc/GAF | 100% ethoxylated (n = 2) nonyl phenol |
| M | Igepal CO-430 (nonionic) | Rhone-Poulenc/GAF | 100% ethoxylated (n = 4) nonyl phenol |
| N | Igepal CO-660 (nonionic) | Rhone-Poulenc/GAF | 100% ethoxylated (n = 9) nonyl phenol |
| O | Igepal CA-887 (nonionic) | Rhone-Poulenc/GAF | 70% ethoxylated (n = 30) octyl phenol in water |
| P | Igepal DM-880 (nonionic) | Rhone-Poulenc/GAF | 100% dinonylphenol ethoxylate (n = 49) |
| Q | Methocel (disp) | Dow Chemical Co. | 100% hydroxypropyl methylcellulose |
| R | Nekal BA-77 (anionic) | Rhone-Poulenc/GAF | 75% sodium alkylnapthalene sulfonate in water |
| S | nonyl phenol (nonionic) | Aldrich Chemical Co. | |
| T | Pluoronic F68 (nonionic) | BASF | 100% ethylene-propylene block copolymer |
| U | Sipex EST-30 (anionic) | Rhone-Poulenc/Alcolac | 30% tridecyl ether sulfate in water |
| V | Siponate DS-4 (anionic) | Rhone-Poulenc/Alcolac | 23% sodium dodecyl benzene sulfonate in water |
| W | Siponic F-300 (anionic) | Rhone-Poulenc/Alcolac | 70% ethoxylated (n = 30) octylphenol in water |
| X | Siponic L25 (anionic) | Rhone-Poulenc/Alcolac | 100% Ethoxylated (n = 23) Lauryl Alcohol |
| Y | Tamol 731 (disp) | Rohm & Haas | 25% sodium salt of a carboxylate polyelectrolyte in water |
| Z | Triton X-200 (anionic) | Rohm & Haas | 28% sodium salt of an alkylaryl polyether sulfoante in water |

While all the above pigments are suitable, example 1 is the preferred orange pigment, example 6 is the preferred pink pigment, example 5 is the preferred yellow pigment, and example 7 is the preferred magenta pigment.

Typical Batch Emulsion Polymerization Procedure For Pigments Containing Soley Anionic Surfactants Water, AMPS, EDTA, dyes and surfactants were added to the reactor in the order listed with agitation. The remaining monomers were mixed and charged to the reactor. A slow nitrogen purge of the emulsion was begun to remove oxygen, and the emulsion was heated in a bath to 50° to 55° C. The initiator was added and the temperature was maintained between 50° and 60° C. After 4 hours the batch was heated to 85° C. and maintained for 45 minutes. The batch was cooled to room temperature to obtain a highly fluorescent dispersion.

Magenta Emulsion

Using the above emulsion polymerization procedures, a typical magenta emulsion having the following formula, was prepared:

| | Wt. % |
|---|---|
| Deionized Water | 56.73 |
| AMPS Sodium Salt | 1.20 |
| Ammonium Nonylphenoxypoly(ethyleneoxy)ethyl Sulfate | .40 |
| Styrene | 22.80 |
| Acrylonitrile | 14.00 |
| Hydroxypropyl Methacrylate | 2.00 |
| Potassium Persulfate | .24 |

Additional examples may be found in Table II.

TABLE II

| Ex. Color | Styrene | Acrylo-nitrile | Polar Vinyl | NaAMPS | Dyes | | | Anionic Surfactants | | Initiators | |
|---|---|---|---|---|---|---|---|---|---|---|---|
| 1 | 57 | 35 | 5 TCHEA | 3 | BR1 1.8 | BV11 1.2 | | A 1.0 | B 2.9 | KPS .6 | |
| 2 | 57 | 35 | 5 MAGME | 3 | BR1 1.8 | BV11 1.2 | | A 1.0 | B 2.9 | KPS .6 | |
| 3 | 57 | 30 | 10 PPGMA | 3 | BR1 1.8 | BV11 1.2 | | A 1.0 | B 2.9 | KPS .6 | |
| 4 | 57 | 35 | 5 VA | 3 | BR1 1.8 | BV11 1.2 | | A 1.0 | B 2.9 | KPS .6 | |
| 5 | 57 | 30 | 10 PPGMA | 3 | BY40 3.0 | | | A 1.0 | B 2.9 | APS .6 | |
| 6 | 52 | 35 | 10 ETGMA | 3 | BR1 1.8 | BV11 1.2 | | A 1.0 | B 2.9 | APS .5 | |
| 7 | 52 | 35 | 10 THFMA | 3 | BR1 1.8 | BV11 1.2 | | A 1.0 | B 2.9 | APS .5 | |
| 8 | 57 | 35 | 5 HPMA | 3 | BR1 0.6 | BV11 0.3 | SY131 2.1 | A 1.0 | B 2.9 | APS .5 | |
| 9 | 57 | 25 | 15 HPMA | 3 | BR1 1.6 | BV11 0.4 | | G 1.3 | B 2.6 | APS .3 | |
| 10 | 57 | 30 | 10 HPMA | 1.5 | BR1 1.2 | BV11 0.5 | | G 1.0 | B 2.9 | APS .3 | |
| 11 | 57 | 35 | 5 HPMA | 1.5 | BR1 1.5 | BV11 1.5 | | A 1.0 | B 2.9 | APS .4 | |
| 12 | 57 | 35 | 5 HPMA | 4.5 | BR1 1.5 | BV11 1.5 | | A 1.0 | B 2.9 | APS .4 | |
| 13 | 57 | 35 | 5 HPMA | 3 | BR1 1.5 | BV11 1.5 | | A 1.0 | B 2.9 | APS .5 | |
| 14 | 62 | 30 | 5 HPMA | 3 | BR1 1.5 | BV11 1.5 | | A 1.0 | B 2.9 | APS .4 | |
| 15 | 57 | 30 | 10 HPMA | 3 | BR1 1.7 | BV11 0.3 | | A 1.0 | B 3.0 | APS .3 | |
| 16 | 57 | 35 | 5 HPMA | 3 1 EHPTMA | BR1 1.5 | BV11 1.5 | | A 1.0 | B 29 | APS .3 | |
| 17 | 53 | 27 | 5 HPMA | 3 12 EHA | BR1 0.5 | BV11 3.0 | SY131 1.1 | G 1.5 | B 2.9 | APS .06 | SFS 0.9 |
| 18 | 65 | 27 | 5 HPMA | 3 | SY131 2.0 | | | A 1.0 | B 2.9 | APS .03 | SFS .04 |

All amount are in grams.
APPENDIX TO TABLE II
St = styrene
AN = acrylonitrile
TCHEA = 2,2,2-trichloro-1-hydroxyethylacrylamide
NaAMPS - sodium 2-acrylamido-2-methylpropane-sulfonate
BR1 = Basic Red 1
BV11 = Basic Violet 11
KPS = potassium persulfate
MAGME = Methyl Acrylamidoglycolate Methyl Ether
PPGMA = Polypropyleneglycol 150 monomethacrylate
VA = Vinyl Acetate
ETGMA = Ethyltriglycolmethacrylate
THFMA = Tetrahydrofurfurylmethacrylate
HMPA = Hydroxypropylmethacrylate
EHPTMA = 2-Ethyl-2-(hydroxy methyl)-1,3-propanediol trimethacrylate
EHA = 2-ethylhexyl methacrylate
SY131 = Solvent Yellow 131
APS = Ammoniium Persulfate
SFS = Sodium formaldehyde sulfoxylate
A = ammonium nonylphenoxypoly (ethyleneoxy) ethylsulfate (Alipal EP110)
B = sodium dodecylbenzenesulfonate (Siponate Ds4)
G = ammonium nonylphenoxypoly (ethyleneoxy) ethylsulfate (Alipal EP120)
F = Sodium dihexyl sulfosuccinate
BY40 = Basic Yellow 40

| | |
|---|---|
| EDTA tetra Sodium Salt | .24 |
| Basic Red 1 | .72 |
| Basic Violet 11 | .48 |
| Sodium Dodecylbenzene Sulfonate | 1.19 |

The emulsion polymerization techniques and suspension polymerization techniques used in the above examples, produce an aqueous dispersion which is ready for use as a pigment in ink or coatings formulations. However, the dispersion may be concentrated, dried or diluted depending on the end use of the dispersion or the pigment. The dispersion may be dried by conventional means to recover the pigment. For example, due to the larger particle size of a pigment produced by suspension polymerization, the pigment particles may be easily filtered to provide a dry form of the pigment. Pigments produced by emulsion polymerization techniques, although not easily filtered, may be dried by other conventional techniques, such as, for example, vacuum oven drying or spray drying.

The dispersion may be concentrated by distillation to remove water to yield a "presscake" form having a solid contents greater than normally produced by the emulsion and suspension polymerization techniques.

Also, a dry or concentrated pigment may be rehydrated when ready to use.

Having thus described our invention it is claimed as follows:

1. An aqueous dispersion of a fluorescent pigment comprising:
   A. a fluorescent pigment comprising:
      1. water insoluble polymer comprising at least four monomers, at least one monomer selected from each of the following groups (1) through (4):
         a. from about 40% to about 78.5% total polymer weight of water insoluble vinyl monomer free of polar groups;
         b. from about 15% to about 35% by total polymer weight of vinyl nitrile;
         c. from about 1.5% to about 5% by total polymer weight of vinyl monomer containing at least one sulfonate group; and
         d. from about 5% to about 20% total polymer weight of polar vinyl monomer selected from the group consisting of:
            (1) polar acrylate esters;
            (2) polar methacrylate esters;
            (3) vinyl acetate;
            (4) a substituted acrylamide containing hydroxyl or carboxylic ester groups; and
            (5) mixtures thereof;
      2. fluorescent dye in an amount sufficient to impart fluorescent color to the pigment;
   B. water in an amount to provide a total solids content of from about 0.5% to less than 100%.

2. The invention of claim 1, wherein the water insoluble non polar vinyl monomer is styrene, the vinyl monomer containing sulfonate groups is sodium 2-acrylamido-2-methylpropane-sulfonate, the polar vinyl monomer is hydroxypropyl methacrylate, and the vinyl nitrile is acrylonitrile.

3. The invention of claim 1, wherein the pigment has a particle size not greater than one micron.

4. The invention of claim 1, wherein the pigment has a particle size not greater than 10 microns.

5. The invention of claim 1, further comprising anionic surfactant.

6. The invention of claim 1, further comprising nonionic surfactant.

7. The invention of claim 1, further comprising dispersant.

8. An aqueous dispersion of a fluorescent pigment comprising:
   A. a fluorescent pigment comprising:
      1. water insoluble polymer comprising at least four monomers, at least one monomer selected from each of the following groups (1) through (4):
         a. from about 40% to about 78.5% total polymer weight of water insoluble vinyl monomer free of polar groups;
         b. from about 15% to about 35% by total polymer weight of vinyl nitrile;
         c. from about 1.5% to about 5% by total polymer weight of vinyl monomer containing at least one sulfonate group; and
         d. from about 5% to about 20% total polymer weight of a polar vinyl monomer selected from the group consisting of:
            (1) polar acrylate esters;
            (2) polar methacrylate esters;
            (3) vinyl acetate;
            (4) a substituted acrylamide containing hydroxyl or carboxylic ester groups; and
            (5) mixture thereof;
      2. fluorescent dye in an amount sufficient to impart fluorescent color to the pigment;
   B. water in an amount to provide a total solids content of from about 0.5% to less than 100%.

9. The invention of claim 8, wherein the water insoluble non polar vinyl monomer is styrene, the vinyl monomer containing sulfonate groups is sodium 2-acrylamido-2-methylpropane-sulfonate, the polar vinyl monomer is hydroxypropyl methacrylate, and the vinyl nitrile is acrylonitrile.

* * * * *